United States Patent Office 3,233,496
Patented Feb. 8, 1966

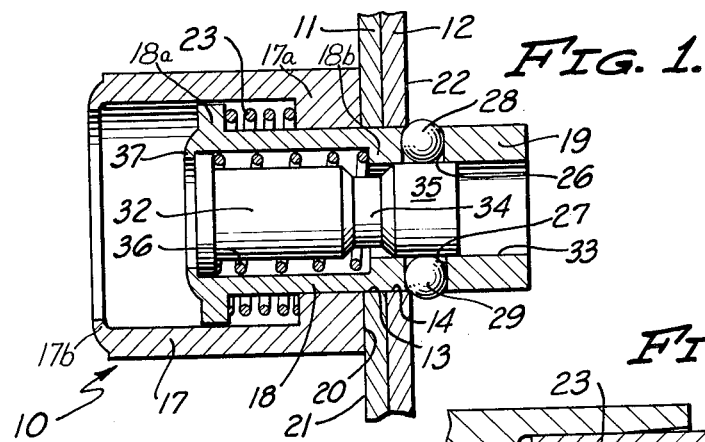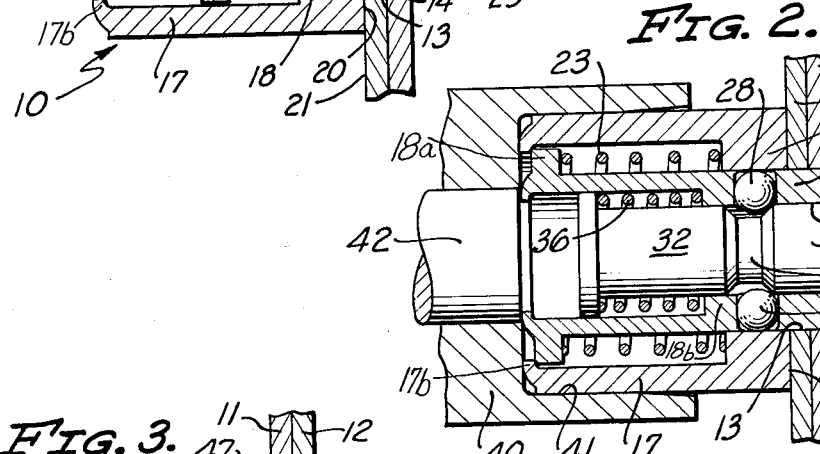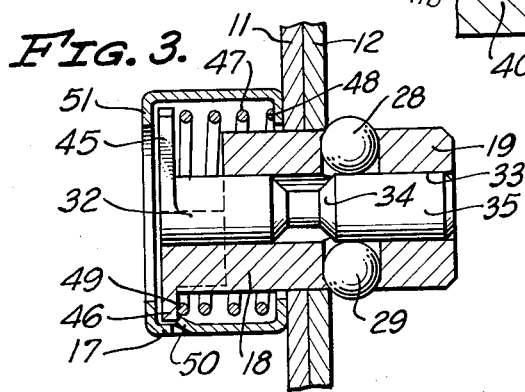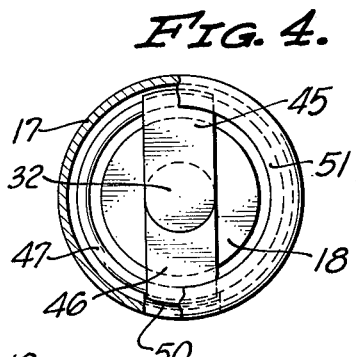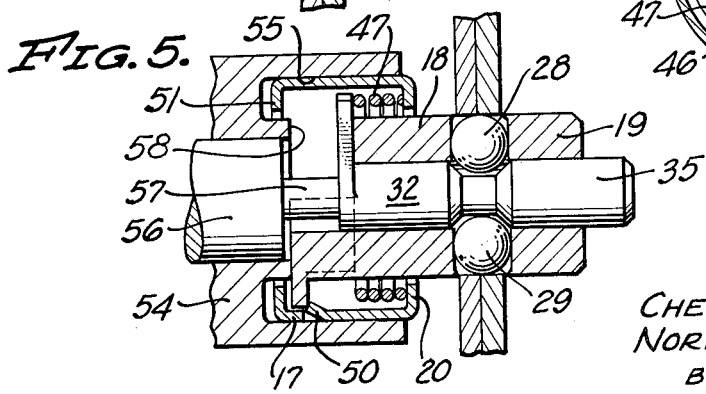

3,233,496
VARIABLE GRIP LOCKING PIN
Chester C. De Pew, Farmingdale, N.Y., and Norval F. Frick, Los Angeles, Calif., assignors, by mesne assignments, to Aerpat A.G., Glarus, Switzerland, a corporation of Switzerland
Continuation of abandoned application Ser. No. 4,521, Jan. 25, 1960. This application Dec. 28, 1962, Ser. No. 248,012
5 Claims. (Cl. 85—5)

This application is a continuation of our copending application Serial No. 4,521 filed January 25, 1960, now abandoned.

This invention relates to fasteners for clamping or gripping structures of various sizes and is often referred to as a variable span pin or fastener. Hence, an object of the invention is to provide a variable grip pin of the self-clamping type. A further object of the invention is to provide a fastener that is reuseable as often as desired with the same size or with different sizes of members to be clamped. A further object is to provide such a fastener that is especially adapted for use with latching means of the ball detent type.

It is an object of the invention to provide a variable grip fastener that may be designed for use with different thicknesses of material and one which is especially adapted for manufacturing in very small sizes. A specific object is to provide such a fastener that may have a maximum diameter in the order of three-sixteenths of an inch. It is an object of the invention to provide a fastener that is suitable for insertion and removal in remote locations by means of tools which place the fastener in position and remove it.

It is an object of the invention to provide a fastener having an outer body and an inner body with the outer body engaging one surface of a structure being clamped and the inner body projecting through the structure to the other surface. A further object is to provide such a fastener wherein the inner body carries a detent and pin assembly with the detent adapted for engaging the other surface of the structure and the pin adapted for moving the detent between retracted and extended positions. A further object is to provide such a structure including spring means for urging the pin toward its locked position and urging the inner body toward its inserting position so that the detent is extended and the structure is clamped between the outer body and the detent. A further object is to provide such a fastener wherein the locking and clamping is achieved with a single spring. A still further object is to provide such a fastener wherein the locking and clamping is achieved with two separate springs.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a sectional view of a preferred form of the fastener of the invention in the clamping position;

FIG. 2 is a sectional view of the structure of FIG. 1 with the inner body in the inserting position;

FIG. 3 is a sectional view of an alternative form of the invention in the clamping position;

FIG. 4 is an end view of the structure of FIG. 3; and

FIG. 5 is a sectional view of the structure of FIG. 3 in the inserting position.

Referring now to the embodiment of FIGS. 1 and 2, the fastener 10 is being used in conjunction with a structure comprising plates 11, 12 for clamping the plates together, the plates having aligned openings 13, 14 through which a portion of the fastener passes.

The fastener includes an open ended, tubular outer body 17 and an inner body 18, the inner body being carried by the outer body, preferably in the telescoping form shown in the drawing, with a bolt portion 19 of the inner body projecting beyond the outer body for entering the aligned openings of the plates. As shown in the drawing, the inner body 18 is guided for sliding movement within the outer body 17 by an internal flange 17a at one end of body 17 fitting closely about the body 18, and by an external flange 18a on one end of body 18 fitting closely within larger bore of body 17. An end 20 of the outer body forms an abutment for engaging an outer surface 21 of the plate 11 and the inner body carries a latching means for engaging the outer surface 22 of the plate 12.

The inner body 18 is slidable relative to the outer body 17 between an inward inserting position, as shown in FIG. 2 and an outward clamping position, as shown in FIG. 1. A spring 23 positioned between shoulders formed by flanges 18a and 17a on the inner and outer bodies and urges the inner body toward the inward inserting position and exerts a clamping force on the plates 11, 12 as explained more fully below.

Various types of latching means may be used with the fastener. A preferred form is shown herein consisting of a detent structure utilizing one or more laterally movable balls. Aligned radial passages 26, 27 are provided in the bolt portion 19 of inner body 18 adjacent the projecting end, with ball detents 28, 29 positioned in the passages 26, 27 respectively, for movement inwardly and outwardly between inner retracted positions, as shown in FIG. 2, and outer extended positions, as shown in FIG. 1. When in their extended positions, the detents 28, 29 prevent withdrawal of the bolt portion from the aligned openings of the plates. The outer ends of the passages 26, 27 are peened or staked to prevent loss of the detents.

A plunger or pin 32 is reciprocable in a longitudinal passage 33 in the inner body between a locked position, as shown in FIG. 1, and an unlocked position, as shown in FIG. 2. An annular groove 34 is provided in the pin 32 to receive the ball detents 28, 29, permitting them to move inwardly to their retracted positions when the pin is in the unlocked position of FIG. 2. An annular section 35 of greater diameter is positioned adjacent the groove 34 for moving the detents outwardly to their extended positions when the pin is moved to its locked position as shown in FIG. 1. A spring is positioned between shoulder 32a on the pin 32 and an internal shoulder 18b on the inner body 18 for urging the pin to its locked position, the pin 32 being retained within inner body 18 by an abutment formed as a rolled-over edge 37 of the inner body.

The fastener is shown in the clamping position in FIG. 1 with the spring 36 urging the pin 32 to its locked position maintaining the detents extended and with the spring 23 urging the inner body toward its inserting position thereby exerting a clamping force on the plates. The fastener is released by applying a force to the pin 32 to compress the spring 36 and move the groove 34 into register with the detents 28, 29. Compression of the spring 36 permits the detents to move inwardly which, in turn, permits the compressed spring 23 to expand, thereby moving the inner body relative to the outer body and withdrawing the detents from the plates to the position of FIG. 2.

The fastener is installed by first placing the end 20 of the outer body in contact with a surface of the structure to be clamped, with the portion 19 of the inner body inserted in the opening of the structure. Then the spring 23 is compressed by applying a force to the inner body to move the inner body and the detents through the opening of the structure. When the detents reach the other outer surface of the structure, they will be moved outward by the action of the spring 36 and the pin 32, to lock the detents in the outer position as shown in FIG. 1.

A tool particularly adapted for inserting the fastener is shown in FIG. 2. The tool includes a tube 40 with a recess 41 in the end thereof and a plunger 42 slidable within the tube. The wall of the tube forming the recess may be slotted to provide a gripping force on the outer body 17 of the fastener. The tool ordinarily is long and thin, permitting insertion of fasteners in locations not manually accessible. For example, a fastener may have a diameter of three-sixteenths of an inch, with the tool being one-quarter inch O.D. tubing and twelve inches in length.

In using the tool, a fastener is pushed into the recess 41 which produces a gripping force on the outer body. The plunger 42 is in the withdrawn position as shown in FIG. 2. Then the end 20 of the outer body is placed in contact with a surface of the structure, with the inner body portion 18–19 projecting through the opening in the structure. The outer body is maintained in this position by means of the tube 40 while the plunger 42 is advanced into engagement with the inner body 18 to compress the spring 23. The inner body 18 is moved to the clamping position with the pin forcing the detents outward. When the fastener is thus positioned, the tool is removed by pulling the tubing 40 away from the outer body.

The fastener of FIGS. 1 and 2 provides for clamping structures of varying thicknesses, the inner and outer body members being slidable relative to each other with the clamping force being produced by the spring positioned between the two bodies.

An alternative form of the fastener utilizing only a single spring is shown in FIGS. 3, 4 and 5. Identical elements in the two embodiments are identified by the same reference numerals.

A flange 45 projects radially from the pin 32 past the inner body 18 and a similar flange 46 projects from the inner body 18 at a different radial angle. The flange of the pin is alignable with the flange of the inner body when the pin is in its locked position as seen in FIG. 3. A spring 47 is positioned around the inner body 18 with one end 48 engaging the outer body 17 and the other end 49 engaging the flanges 46, 47. A stop in the form of a bent-in corner 50 in the outer body 17 limits movement of the inner body toward the outward clamping position and a turned-in rim 51 of the outer body limits movement of the inner body in the opposite direction.

A tool for use in inserting and removing the fastener is shown in FIG. 5, the tool including a tube 54 having a recess 55 for receiving the outer body 17 with an annular boss 58 in the recess 55 for engaging the inner body 18, and a plunger 56 slidable within the tube 54 and terminating in a boss 57 for engaging the pin 32.

The fastener may be positioned in a structure by first placing the outer body in the recess 55 of the tube with the boss 58 moving the flange 46 to the stop 50 and then advancing the plunger 56 to compress the spring 47 and move the pin 32 to its unlocked position, as seen in FIG. 5. Then the projecting portion 19 of the inner body is passed through the aligned opening of the plates and the end 20 of the outer body is brought into contact with the outer surface of a plate. The plunger 56 is now withdrawn permitting the spring 47 to move the pin to its locked position with the detents extended. As the spring expands further it also urges the inner body toward its inserting position and exerts a clamping force on the plates between the outer body and the detents, as seen in FIG. 3. The fastener is removed by reversing this process. The pin is moved to its unlocked position and then the inner body is withdrawn through the openings of the plates. Of course, it should be noted that the fastener may be installed and removed manually as well as by means of the tool disclosed herein.

The fastener of FIGS. 3, 4 and 5 may be used for clamping structures of different thicknesses as is the fastener of FIGS. 1 and 2, and is particularly adapted for use where a very small fastener is required. This alternative embodiment requires only a single spring and may be produced with a maximum diameter as small as three-sixteenths of an inch.

From the foregoing it will be seen that the portion 18 of the inner body located within the outer body comprises a head portion, and the external portion 19 comprises a bolt portion. It will also be noted that the outer body 17 is provided with an inturned flange 17b at its outer end which forms an abutment to prevent movement of the head portion 18 of the inner body out of the outer end of the outer body 17. The rolled-over edge 37 at the end of the inner body head portion 18 forms an abutment to prevent movement of the head of pin 32 out of the end of the inner body 18.

In FIGS. 3 to 5, the flange 45 carried by pin 32 comprises an abutment on which a portion of the outer end of spring 47 is seated, and flange 46 carried by inner body 18 comprises an abutment on which another portion of the outer end of spring 47 is seated.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. A releasable blind fastener for clamping plate members having openings therein comprising, in combination: a tubular outer body having an open end and a centrally bored abutment end for engaging a surface of a member to be clamped; an inner body having an open-ended head portion telescopingly slidable within said outer body and having a bolt portion projecting beyond said abutment end for entering an opening in the member to be clamped, said inner body being movable in said outer body between an inward inserting position and an outward clamping position, an abutment carried by said outer body to prevent movement of the head portion of said inner body out of said outer body, said inner body having a longitudinal passage open at the inward end thereof; a detent carried adjacent the projecting end of said bolt portion of the inner body and movable between inner retracted and outer extended positions, said detent projecting laterally from said inner body when in said extended position to engage the member to be clamped on the surface thereof opposite from the surface engaged by the abutment end of said outer body; a pin movable in said passage between inward locked and outward unlocked positions and having means thereon for moving said detent into its extended position when said pin is in said locked position and means thereon to receive the detent when in the unlocked position, the head end of said pin being located within the open-ended head portion of said inner body; and spring means positioned about said pin and within said outer body and urging said pin toward said inward locked position and urging said inner body toward said inserting position for clamping a member between said abutment end of said outer body and said extended detent, abutment means carried by one of said bodies to prevent movement of the head end of said pin out of the open end of said outer body, the head of said pin being accessible through the open ends of said outer and inner bodies, whereby pressure may be applied to the head end of said pin through said open ends to move said pin against said spring means.

2. A fastener according to claim 1 wherein said spring means comprises a locking spring acting between abutments on said pin and inner body and urging said pin towards said inward locked position and a clamping spring acting between abutments on said inner and outer bodies and urging said inner body towards said inward inserting position.

3. A fastener according to claim 2, wherein said detent is located on said bolt portion in such position that, when said inner body is in its inner inserting position, the detent is located in the bore of the abutment end of said outer body and is held by the outer body in its retracted position.

4. A releasable blind fastener for clamping plate members having openings therein comprising, in combination: a tubular outer body having an open end and a centrally bored abutment end for engaging a surface of a member to be clamped; an inner body having an open ended head portion telescopingly slidable within said outer body and having a bolt portion projecting beyond said abutment end for entering an opening in the member to be clamped, said inner body being movable in said outer body between an inward inserting position and an outward clamping position, an abutment carried by said outer body to prevent movement of the head portion of said inner body out of said outer body, said inner body having a longitudinal passage open at the inward end thereof; a detent carried adjacent the projecting end of said bolt portion of the inner body and movable between inner retracted and outer extended positions, said detent projecting laterally from said inner body when in said extended position to engage the member to be clamped on the surface thereof opposite from the surface engaged by the abutment end of said outer body; a pin movable in said passage between inward locked and outward unlocked positions and having means thereon for moving said detent into its extended position when said pin is in said locked position and means thereon to receive the detent when in the unlocked position, the head end of said pin being located within the open-ended head portion of said inner body; and spring means positioned about said pin and within said outer body and urging said pin toward said inward locked position and urging said inner body toward said inserting position for clamping a member between said abutment end of said outer body and said extended detent, abutment means carried by one of said bodies to prevent movement of the head end of said pin out of the open end of said outer body, the head of said pin being accessible through the open ends of said outer and inner bodies, whereby pressure may be applied to the head end of said pin through said open ends to move said pin against said spring means, said spring means comprising a single helical spring having one end seated on an internal shoulder on said outer body adjacent the abutment end thereof, the other end of said spring having one portion thereof seated on an abutment carried by said pin and another portion seated on an abutment carried by said inner body.

5. A releasable blind fastener for clamping plate members having openings therein comprising, in combination: a tubular outer body having an open end and a centrally bored abutment end for engaging a surface of a member to be clamped; said outer body having an inwardly extending abutment adjacent the open end thereof and an inwardly extending radial shoulder axially spaced from the abutment, an inner body having a radially extending head portion slidably positioned between the abutment and the radial shoulder on the outer body and having a bolt portion projecting through the bore of said abutment end for entering an opening in the member to be clamped, said inner body being movable in said outer body between an inward inserting position and an outward clamping position, the abutment carried by said outer body adjacent the open end thereof serving to prevent movement of the head portion of said inner body out of said outer body, said inner body having a longitudinal passage open at the inward end thereof; a ball detent carried adjacent the projecting end of said bolt portion of the inner body and movable between inner retracted and outer extended positions, said detent projecting laterally from said inner body when in said extended position to engage the member to be clamped on the surface thereof opposite from the surface engaged by the abutment end of said outer body; a pin movable in said passage between inward locked and outward unlocked positions and having means thereon for moving said detent into its extended position when said pin is in said locked position and means thereon to receive the detent when in the unlocked position, the head end of said pin being located within the open-ended head portion of said inner body; and spring means positioned about said pin and within said outer body and urging said pin toward said inward locked position and urging said inner body toward said inserting position for clamping a member between said abutment end of said outer body and said extended detent, abutment means carried by the inner body adjacent the open end thereof to prevent movement of the head end of said pin out of the open end of said outer body, a radial shoulder in the longitudinal passage of said inner body axially spaced from said abutment means, said pin having a radially extending head portion slidably positioned between the abutment means and the shoulder on the inner body, the head portion of said pin being accessible through the open ends of said outer and inner bodies, whereby pressure may be applied to the head end of said pin through said open ends to move said pin against said spring means.

References Cited by the Examiner

UNITED STATES PATENTS

| | | |
|---|---|---|
| 2,256,243 | 9/1941 | Edwards. |
| 2,313,883 | 3/1943 | Lowther. |
| 2,373,083 | 4/1945 | Brewster. |
| 3,117,484 | 1/1964 | Myers. |

FOREIGN PATENTS 897,080   5/1944   France.

CARL W. TOMLIN, *Primary Examiner.*

EDWARD C. ALLEN, *Examiner.*

R. S. BRITTS, *Assistant Examiner.*